United States Patent
Migoya

(10) Patent No.: US 10,891,440 B1
(45) Date of Patent: Jan. 12, 2021

(54) NATURAL LANGUAGE DRIVEN TRANSACTION SYSTEM

(71) Applicant: Globant España, S.A., Derecha (ES)

(72) Inventor: Martin Migoya, Buenos Aires (AR)

(73) Assignee: Globant España, S.A., Derecha (ES)

( * ) Notice: Subject to any disclaimer, the term of this patent is extended or adjusted under 35 U.S.C. 154(b) by 0 days.

(21) Appl. No.: 16/781,895

(22) Filed: Feb. 4, 2020

Related U.S. Application Data

(60) Provisional application No. 62/928,300, filed on Oct. 30, 2019.

(51) Int. Cl.
*G06F 40/30* (2020.01)
*G06N 3/08* (2006.01)

(52) U.S. Cl.
CPC .............. *G06F 40/30* (2020.01); *G06N 3/08* (2013.01)

(58) Field of Classification Search
CPC .................................. G06F 40/30; G06N 3/08
See application file for complete search history.

(56) References Cited

U.S. PATENT DOCUMENTS

| | | | |
|---|---|---|---|
| 3,513,309 A | 5/1970 | Hehemann | |
| 5,845,267 A | 12/1998 | Ronen | |
| 5,905,736 A | 5/1999 | Ronen et al. | |
| 7,490,155 B1 | 2/2009 | Slowiak et al. | |
| 8,433,809 B2 | 4/2013 | Dor et al. | |
| 8,898,286 B2 | 11/2014 | Garrett et al. | |
| 9,226,154 B2 | 12/2015 | Gumirov et al. | |
| 10,219,122 B1* | 2/2019 | Scanlon | H04L 51/20 |
| 2003/0177028 A1 | 9/2003 | Cooper et al. | |
| 2008/0109335 A1 | 5/2008 | Keohane et al. | |
| 2011/0137791 A1 | 6/2011 | Zabawskyj et al. | |
| 2013/0232061 A1 | 9/2013 | Gueron et al. | |
| 2016/0098386 A1* | 4/2016 | Rangarajan Sridhar | G06F 40/58 704/9 |
| 2017/0358299 A1 | 12/2017 | Schlesinger et al. | |
| 2018/0081950 A1 | 3/2018 | Mishra et al. | |

(Continued)

FOREIGN PATENT DOCUMENTS

| | | |
|---|---|---|
| CN | 109313666 A | 2/2019 |
| CN | 109690527 A | 4/2019 |

(Continued)

OTHER PUBLICATIONS

International Search Report for PCT Application PCT/I B2020/050889, dated Jul. 10, 2020.

(Continued)

*Primary Examiner* — Mohammad K Islam
(74) *Attorney, Agent, or Firm* — Rowan TELS LLC

(57) ABSTRACT

A system is disclosed comprising a messaging gateway, a natural language processor, and a context controller. The system further comprises logic to configure the natural language processor. The natural language processor is configured to drive the messaging gateway in a feedback loop without engaging the context controller. During this process, a context state of a transaction initiated with a backend server system through the messaging gateway remains incomplete. The system further comprises logic to engage the context controller with the context state and to intermediate the transaction between the backend server system and the messaging gateway once the context state meets a completion threshold.

18 Claims, 13 Drawing Sheets

(56) References Cited

U.S. PATENT DOCUMENTS

| | | | |
|---|---|---|---|
| 2018/0083892 A1 | 3/2018 | Viswanathan et al. | |
| 2018/0083893 A1 | 3/2018 | Viswanathan et al. | |
| 2018/0248817 A1 | 8/2018 | Licht et al. | |
| 2018/0375947 A1* | 12/2018 | Hodges | H04L 67/10 |
| 2019/0042988 A1* | 2/2019 | Brown | G06F 9/547 |
| 2019/0102078 A1* | 4/2019 | Bhatt | G06F 3/04847 |
| 2019/0103095 A1* | 4/2019 | Singaraju | G06N 20/10 |
| 2019/0189121 A1 | 6/2019 | Schlesinger et al. | |
| 2019/0258967 A1* | 8/2019 | Gonzalez | G06Q 50/14 |
| 2020/0057946 A1* | 2/2020 | Singaraju | G06N 5/041 |

FOREIGN PATENT DOCUMENTS

| | | |
|---|---|---|
| CN | 109690535 A | 4/2019 |
| CN | 109691036 A | 4/2019 |
| EP | 3073421 A1 | 9/2016 |
| EP | 3469491 A1 | 4/2019 |
| EP | 3513307 A1 | 7/2019 |
| EP | 3513308 A1 | 7/2019 |
| JP | 2019533235 A | 11/2019 |
| JP | 2019537767 A | 12/2019 |
| JP | 2019537768 A | 12/2019 |
| WO | 2017218273 A1 | 12/2017 |
| WO | 2018052542 A1 | 3/2018 |
| WO | 2018052543 A1 | 3/2018 |
| WO | 2018052544 A1 | 3/2018 |

OTHER PUBLICATIONS

Written Opinion of the ISA for PCT Application PCT/IB2020/050889, dated Jul. 10, 2020.

\* cited by examiner

NATURAL LANGUAGE DRIVEN TRANSACTION SYSTEM

CROSS REFERENCE TO RELATED APPLICATIONS

This application claims the benefit of U.S. provisional patent application Ser. No. 62/928,300, filed on Oct. 30, 2019, the contents of which are incorporated herein by reference in their entirety.

FIELD

The present disclosure relates to systems and methods to transform natural language inputs into complex interactions between diverse machine systems.

BACKGROUND

Instant messaging is a common means of communication. Instant messaging involves exchanging messages between two or more people or entities. Non-limiting examples of instant messaging client applications include WhatsApp, Facebook Messenger, and Slack.

Another common means of communication is Short Message service (SMS). SMS and the related Multimedia Message service (MMS) are messaging services that enable textual messages, images, and video to be transmitted and received from a cellular phone. SMS and MMS messages are stored and forwarded at telecommunication server systems. Messages can be retrieved later if a user is not immediately available to receive them. Such messages travel to a cellular phone over a system's control channel, which is separate and apart from the voice channel. SMS and MMS messaging client applications are installed on virtually all mobile phones.

Many different messaging client applications and technologies thus exist for communication between messaging client applications, utilizing a variety of user interfaces, communication protocols, security requirements, and so on. There are also countless backend server systems with which such messaging client applications interact. This diversity is a benefit to users but a challenge to the implementation of complex transactions driven by natural language inputs to those messaging client applications. "Natural language" refers to a spoken and/or written language used and evolved for use among people in human societies. In particular, it can be challenging to maintain consistency and performance for completing complex transactions in such a heterogeneous technological environment.

Some modern client applications utilize a 'chat bot', i.e., a digital personal assistant such as Apple® Siri®, Google® Assistant®, Amazon® Alexa®, Microsoft® Cortana®, and others. Chat bots may accept inputs and/or output responses in various formats, including text, audio, video, and animation. Chat bots can be used to request and perform various data exchanges, including transactions. "Transaction" refers to an exchange of signals to generate a particular result.

Conversational interfaces may be included in social networks, mobile applications, instant messaging platforms, websites, and other locations or applications. However, depending on the type of transaction required and the nature of the interactions it entails between disparate backend server systems, these chat bots may suffer from inconsistent or slow performance.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
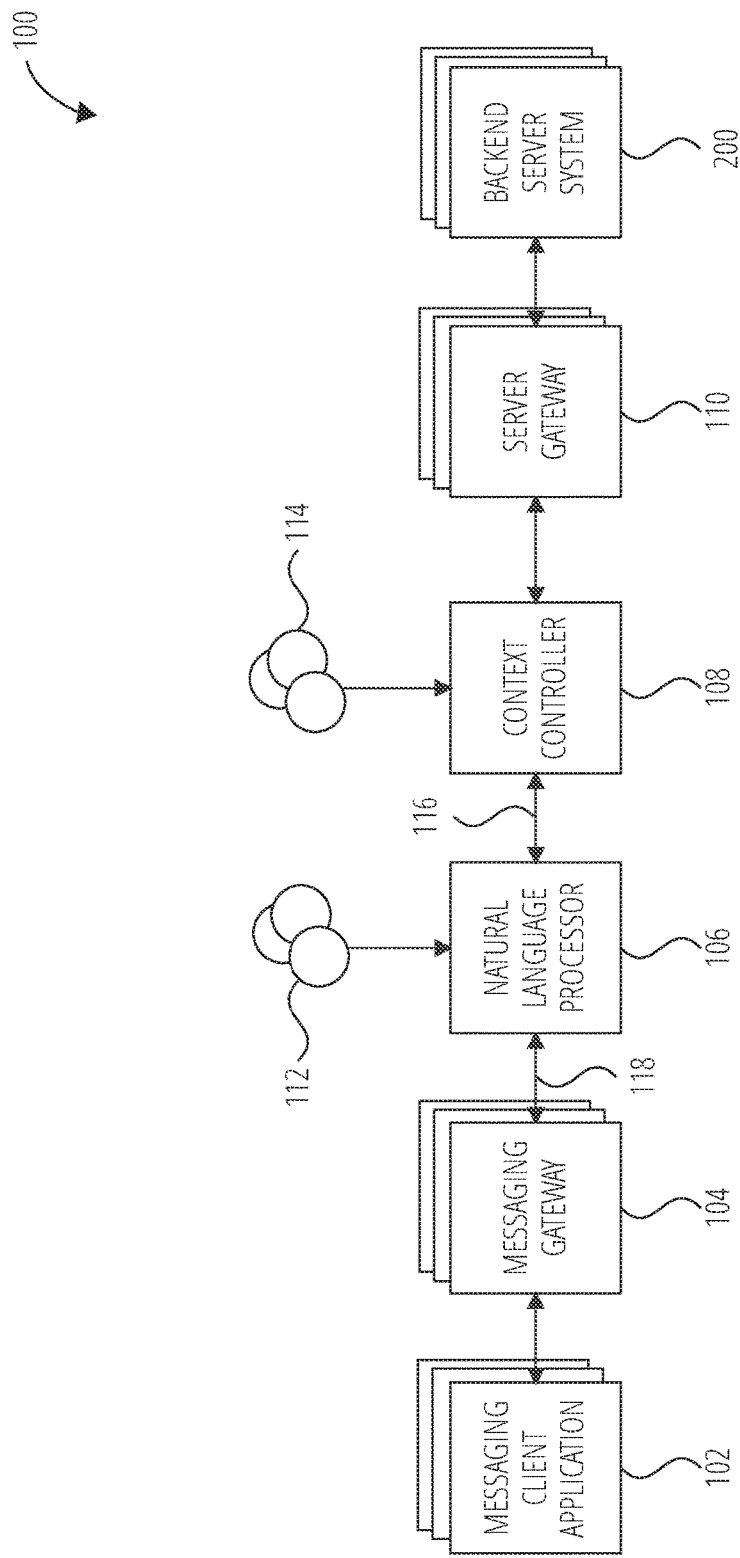
FIG. 1 depicts a transaction system 100 in accordance with one embodiment.

Certain terms are used in this disclosure and should be understood to have their ordinary meaning in the art, unless expressly defined or taking on a different interpretation based on context.

Herein, "backend server system" refers to a computer system providing data storage and services to client applications over a data communication network. "Messaging gateway" refers to logic comprising a first application program interface to a messaging client application and a second application program interface to a natural language processor or other logic.

"Natural language processor" refers to logic configured to transform natural language inputs into machine settings that characterize features of the inputs. The features may then be applied to control machine behavior such as transaction signaling. "Context controller" refers to logic that controls signaling to and from a backend server system during a transaction and which engages with a natural language processor for signaling with a messaging client application.

"Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system.

"App" refers to a type of application with limited functionality, most commonly associated with applications executed on mobile devices. Apps tend to have a more limited feature set and simpler user interface than applications as those terms are commonly understood in the art.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client. "Process" refers to software that is in the process of being executed on a device.

"Feedback loop" refers to a closed signaling loop between machine components. "Context state" refers to the state of completion of context settings. "Context settings" refers to control settings in the form of parameters extracted from messages in a transaction that determine state machine behavior. "State machine" refers to logic that tracks and updates one or more internal state settings as driven by inputs to the state machine component. State transitions within a state machine are commonly determined by a current state of the state machine on the input meeting one or more conditions. "Completion threshold" refers to a configured condition that determines that a set of context settings is sufficiently complete to trigger the initiation of transaction signals to a backend server system.

Embodiments of a system are disclosed in which a chat bot or other messaging client application interacts with a backend server system via several intermediating components, specifically a messaging gateway, a natural language processor, and a context controller. "Messaging client application" refers to an application or app that generates messages that initiate transactions. A messaging client application is often operated by a person but may in some cases be a machine component acting as an agent or other transaction initiator.

The natural language processor drives the messaging gateway in a feedback loop without engaging the context controller while a context state of a transaction initiated with the backend server system through the messaging gateway remains incomplete.

The natural language processor engages the context controller with the context state and intermediates the transaction between the backend server system and the messaging gateway on condition that the context state meets a completion threshold. In one embodiment, the context state is a transaction intent. "Transaction intent" refers to the particular result to be generated from a transaction. The natural language processor may be implemented using a neural network where the transaction intent is a classification value output by the neural network.

The natural language processor aggregates and transforms multiple distinct natural language messages from the messaging gateway into the context state, if necessary. In other words, if the context state for a transaction is incompletely determined in an initiating message from the messaging gateway, the natural language processor drives a feedback loop through the messaging gateway to the messaging application that initiated the transaction until such time as the context state meets a completion threshold such that the natural language processor can determine an intent of the transaction. The feedback loop is driven by the natural language processor independently of the context controller and without engaging the context controller until the intent is determined, at which point the natural language processor engages the context controller. Backends to disparate server systems are inherently inconsistent in the latency of processing transactions. "Disparate server systems" refers to backend server systems owned and operated by different legal entities. Disparate server systems are often but not necessarily in different geographical locations. Disparate server systems may in some cases be multi-tenant or shared physical systems that are logically partitioned to be disparate/distinct. The disclosed systems may substantially increase the performance, responsiveness, and consistency of the natural language interface (e.g., as implemented in a chat bot) to such disparate server systems as compared to conventional approaches.

The natural language processor drives the feedback loop through the messaging gateway with response messages until the context state meets the completion threshold. In some transactions, the natural language processor may receive images (or even video) via the messaging gateway and may execute a non-transformative pass-through of the images to the context controller. "Non-transformative pass-through" refers to passing data input to a machine component to the output of the component without transforming the data input to a different format, reduction, parameterization etc. (It should be understood that references to images herein also apply to video and animations). Image transformation logic is configured on the backend to receive and transform the images to text, with a server gateway disposed between the image transformation logic and the context controller. "Image transformation logic" refers to logic that transforms image data into text or classifications (e.g., predictions of objects depicted in the images). "Server gateway" refers to a logic component that intermediates signals directed to a backend server system. The context controller uses the server gateway to initiate on-demand services to interact with the image transformation logic and transform the image based, for example, on what the image represents. "On-demand services" refers to one or more services that are instantiated or executed when needed rather than always being loaded and executing, waiting to service a request. Image transformation logic includes algorithms known in the art, such as optical character recognition and neural networks. The image transformation logic may operate to enhance the context state provided by the natural language processor based on what the image represents. The context controller receives the enhanced context state from the image transformation logic and drives the messaging gateway based on the enhanced context state. This may include prompts for additional information from the messaging client application.

The natural language processor and the context controller may utilize different distinct state machines that operate independently of one another, with the state machine of the natural language processor driving a feedback loop based on natural language messages received via the messaging gateway, and the context controller driving a feedback loop through the messaging gateway based on information extracted from images, said image-extracted information received over a server gateway from a backend.

In some embodiments the context controller may configure the state machines of the natural language processor for particular transactions. The natural language processor transforms natural language messages representing transactions into context settings, applies configuration settings from a state machine to determine a completion threshold of the context settings, drives the messaging gateway (disengaged from and independently of the context controller, once configured) in a feedback loop while the context settings do not meet the completion threshold. The natural language processor then applies the context settings to handoff the transaction to the context controller to drive a backend server system once the context settings meet the completion threshold.

FIG. 1 depicts a transaction system 100 in one embodiment. The transaction system 100 comprises a messaging client application 102, a messaging gateway 104, a natural language processor 106, a context controller 108, a server gateway 110, a state machine 112, a state machine 114, and a backend server system 200.

The messaging client application 102 may be bidirectionally coupled to the messaging gateway 104 to both send and receive messages in the form of electronic signals through the messaging gateway 104. The messaging client application 102 may be one of a number of messaging platforms commercially available to mobile device users, such as WhatsApp, SMS texting, Slack, Facebook Messenger, etc. The messaging client application 102 may provide a user interface that a user of the messaging client application may easily access and operate using natural language and images.

The messaging gateway 104 may be bidirectionally coupled between the messaging client application 102 and the natural language processor 106. The messaging gateway 104 (there may be more than one) creates an abstraction layer that allows a seamless interaction between a number of different messaging client applications and the natural language processor. Messages may be input by a user and communicated to the natural language processor or may be generated by transaction system 100 logic and communicated as natural language messages back to the user through this path.

The natural language processor 106 may be bidirectionally coupled between the messaging gateway 104 and the context controller 108. The natural language processor 106 may also receive control input from a state machine 112. In some embodiments, the natural language processor 106 may comprise a neural network. The natural language processor 106 may be an application such as Google's DialogFlow, Microsoft LUIS, Rasa NLU, etc. The natural language processor 106 may apply algorithms to identify and extract natural language rules from messages sent by a user such that unstructured language data may be converted into a structured format for processing by the computational components in the transaction system 100.

For example, the natural language processor 106 may aggregate and transform a plurality of distinct natural language messages regarding desired transactions, received from the messaging gateway 104, into a context state that may be communicated to the context controller 108. This context state may take the form of a transaction intent, such as an intent to re-allocate resources based on a user message such as, "Send N resources of type X to Y." The transaction intent may also represent a classification value. This context state or transaction intent 116 may be communicated between the natural language processor 106 and context controller 108 and may be incremented or otherwise managed within state machine 112 and/or state machine 114 of the natural language processor 106 and context controller 108, respectively.

The natural language processor 106 may be configured to drive the messaging gateway 104 in a feedback loop without engaging the context controller 108 while a context state of a transaction initiated with a backend server system 200 through the messaging gateway remains incomplete. This feedback loop may be driven with response messages 118 until the context state meets the completion threshold. For example, a user may request a transfer with a message reading, "Send X resources to Y." An amount will be necessary before the transaction can continue, and the natural language processor 106 may continue to interact through the feedback loop with the messaging gateway 104 until all of the necessary transaction parameters are received through the messaging gateway 104.

As another example, the backend server system 200 may indicate that resources are insufficient to complete the transfer, and the natural language processor 106 may direct the user through options to add additional resources, and return to the original transfer work flow once these new workflows have resolved, rather than causing the transfer to fail immediately. Incrementation or other management of this context state and comparison to the completion threshold may be managed within the state machine 112. The state machine 112 may configure and operate the natural language processor 106 independently from configuration and operation of the context controller 108 by the state machine 114. In this manner, the natural language processor 106 may be configured to ensure that all data necessary to complete the transaction or a next step of the transaction are available before an intent is sent to the context controller 108, which may enable the transaction system 100 to work more efficiently, as an incomplete request may not need to be sent through the entire path to the backend server system 200 before an issue is detected.

The natural language processor 106 may additionally be configured to maintain a recognition of the context of an ongoing transaction and may use this contextual awareness to determine how to respond to messages received via the messaging gateway 104. Such messages may take the form of an image such as a photograph. The natural language processor 106 may pass an image directly to the context controller 108 with an assigned intent without attempting to process the information in the image. Image handling is discussed in further detail with regard to FIG. 2.

The context controller 108 may be bidirectionally coupled between the natural language processor 106 and a server gateway 110. When the natural language processor 106 identifies an intent with a transaction, the context controller 108 may act to validate the intent against information or business logic specific to a backend server system 200 and not accessible to the natural language processor 106. The context controller 108 may in some implementations provide a web hook to receive and process transactions and interface with the server gateway 110 and/or messaging gateway 104 in order to perform transactions. In some embodiments the context controller 108 may communicate a response message back to the messaging gateway 104. "Response message" refers to a message generated in response to a received signal or message.

For some transactions, the context controller 108 may assume the role previously described for the natural language processor 106, may recognize when necessary information is missing from a transaction, and may drive or assist the natural language processor 106 in driving the feedback loop to meet the completion threshold of the context settings before engaging the backend server system 200 through the server gateway 110.

The server gateway 110 may be bidirectionally coupled between the context controller 108 and the backend server system 200. The server gateway 110 provides an API that acts as an interface between the context controller 108 and the backend server system 200. The server gateway 110 may be responsible for performing and persisting transactions with the backend server system 200 and may be specific to the backend server system 200. The context controller 108 may thus interact with multiple server gateways.

The backend server system 200 couples with the transaction system 100 bidirectionally through the server gateway 110. An exemplary backend server system 200 is depicted in more detail in FIG. 2.

Those of skill in the art will recognize that the transaction system 100 may comprise additional elements that are omitted from this depiction as unnecessary to describing its relevant aspects. Additionally, numerous details (such as known subcomponents typically utilized in the depicted components) are also omitted. The transaction system 100 may in one embodiment operate according to the process depicted in FIG. 3.

Figure 2:
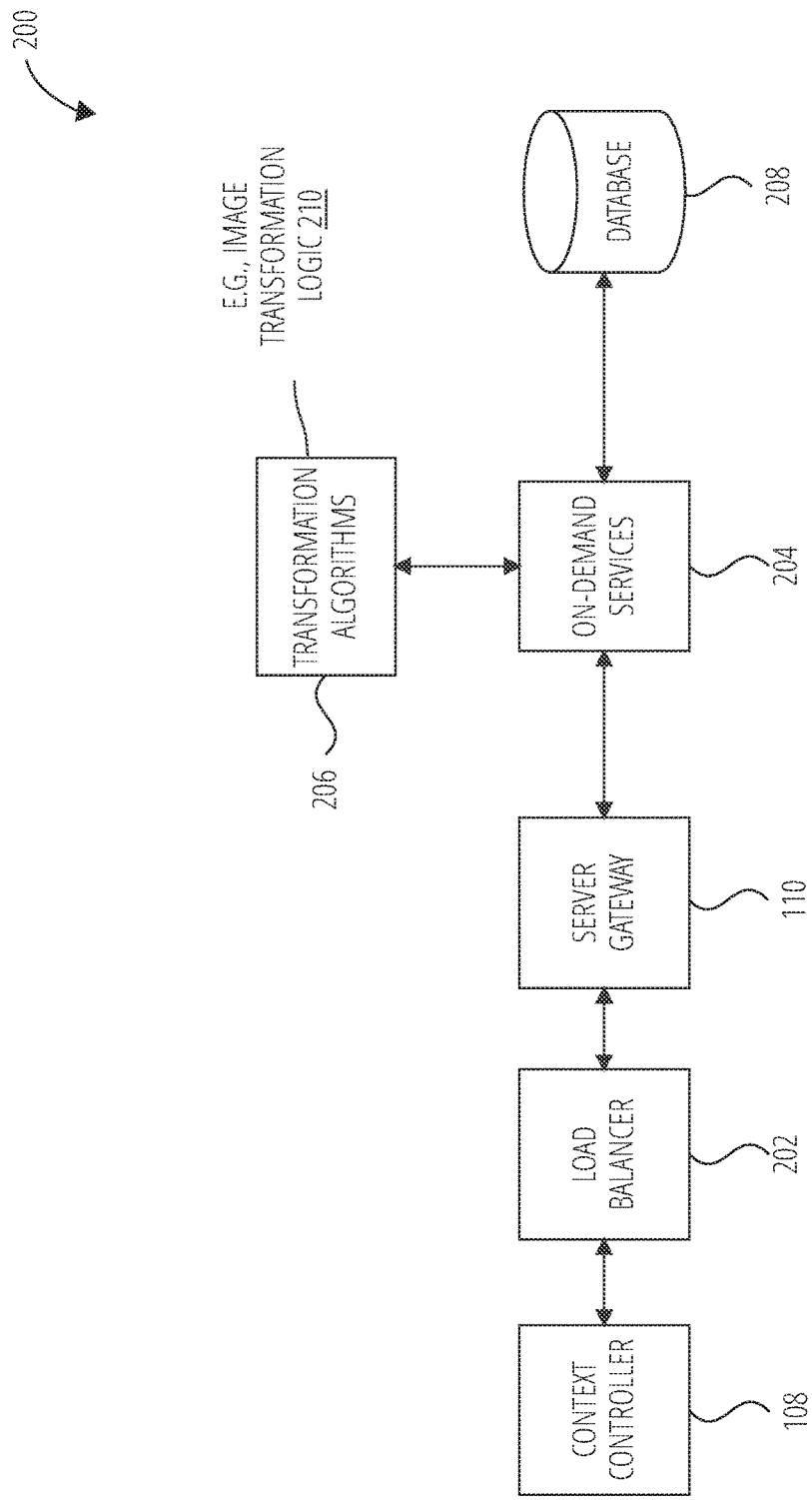
FIG. 2 depicts a backend server system 200 in accordance with one embodiment.

FIG. 2 depicts a backend server system 200 in one embodiment. The backend server system 200 interacts with the context controller 108 through the server gateway 110, as depicted in FIG. 1. Additionally, the backend server system 200 may comprise a load balancer 202, on-demand services 204, transformation algorithms 206, and a database system 208.

The load balancer 202 may be bidirectionally coupled between the context controller 108 and server gateway 110. As a common component of server systems known in the art, the load balancer 202 may allocate queries from the context controller 108 to different physical servers through at least one server gateway 110 based on how busy the available servers are, available bandwidth, and possibly other factors.

On-demand services 204 may be coupled between the server gateway 110 and the database system 208 to query, write, manipulate, and/or transform transactional data stored on the database system 208. On-demand services 204 are services invoked and executed as needed for particular transactions. On-demand services 204 and the commands to operate them for many types of common resource management transactions are well known in the art.

Transformation algorithms 206 (e.g., image transformation logic 210) may be executed when performing on-demand services 204. Such services may include optical character recognition algorithms and neural network algorithms known in the art. These algorithms may be used to extract data from images to implement intents indicated in a transaction.

The database system 208 implements a data storage repository for the backend server system 200 to securely store account and transaction data associated with users of the messaging client application. Each of multiple disparate server systems on the backend may implement and maintain their own distinct database system 208. The database system 208 may include a database abstraction layer interface in order to interact with any number of additional logic modules, such as those providing on-demand services 204, the load balancer 202, etc. These database abstraction layers are well known in the art.

The natural language processor 106 may be configured to receive images through the messaging gateway 104 and to execute a non-transformative pass-through of these images to the context controller 108. The transformation algorithms 206 may incorporate image transformation logic to receive and transform the images to text and/or to identify objects (specific patterns) in the images. The context controller 108 may initiate, via the server gateway 110, one or more on-demand services 204 to interact with the image transformation logic. The image transformation logic may be configured to enhance the context state. The context controller 108 may receive this enhanced context state from the image transformation logic and drive the messaging gateway based on the enhanced context state. In this manner, images of transaction instruments may be applied to drive and complete transactions. Should an error occur in processing an image, the transaction state may evolve to cause the natural language processor 106 or context controller 108 to prompt for manual entry of the information depicted on the transaction instrument to continue with the transaction.

Those of skill in the art will recognize that the backend server system 200 may comprise additional elements that are omitted from this depiction as unnecessary to describing its relevant aspects. Additionally, numerous details (such as known subcomponents typically utilized in the depicted components) are also omitted.

Figure 3:
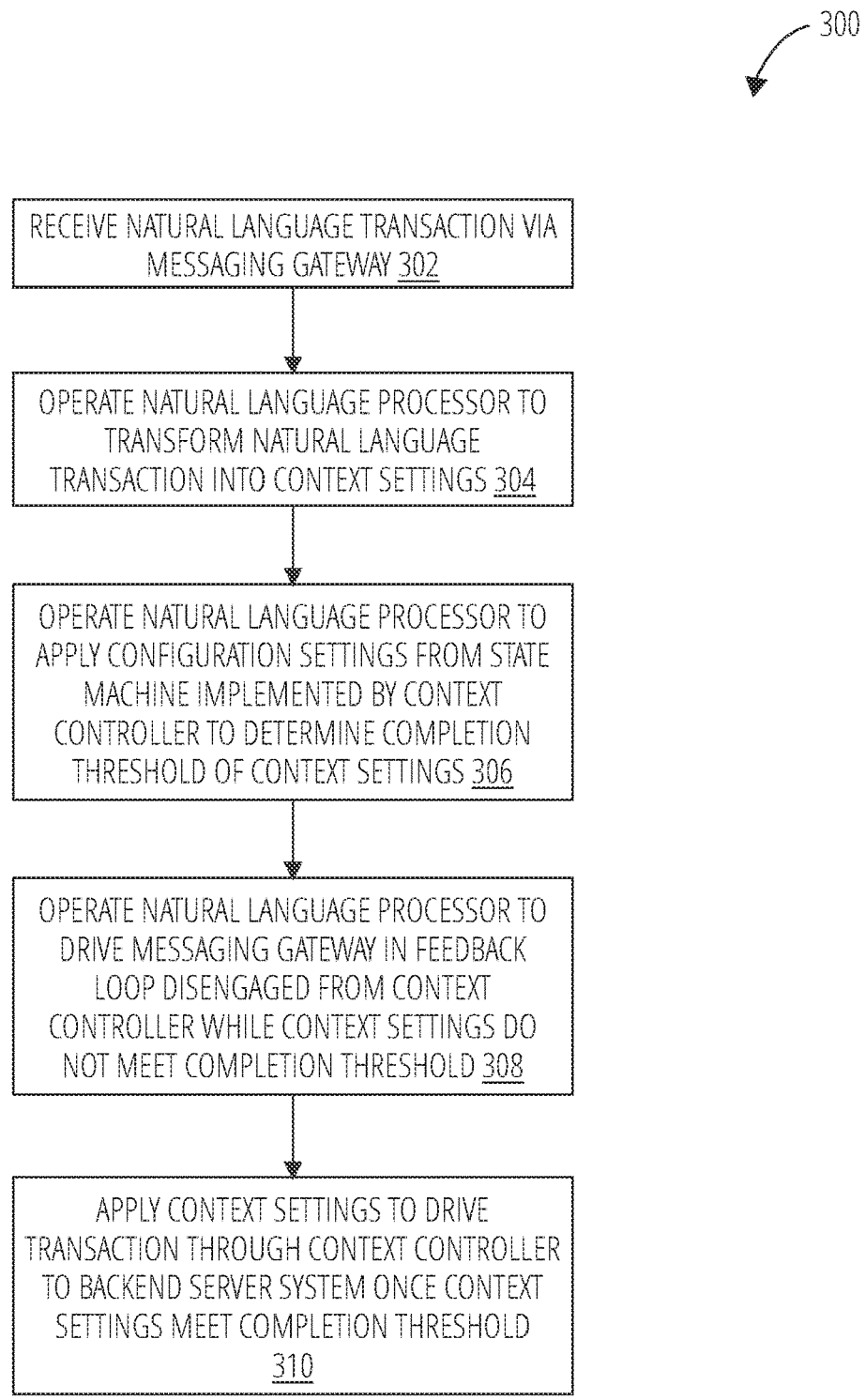
FIG. 3 depicts a natural language transaction process 300 in accordance with one embodiment.

FIG. 3 depicts a natural language transaction process 300 in one embodiment. The natural language transaction process 300 enables a user to input and complete a natural language transaction via a messaging client application. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 302, the natural language processor receives a natural language transaction via a messaging gateway. This action may be carried out for example by the messaging client application 102 and messaging gateway 104 first introduced in FIG. 1.

At block 304, the natural language processor may be operated to transform the natural language transaction received in block 302 into context settings. Context settings may, for example, comprise a transaction intent inferred from the natural language message sent by a user. This action may be carried out for example by the natural language processor 106 first introduced in FIG. 1.

At block 306, the natural language processor may apply configuration settings from a state machine implemented by a context controller to determine a completion threshold of the context settings generated in block 304. These actions may be carried out by the natural language processor 106, context controller 108, state machine 112, and/or state machine 114 introduced in FIG. 1.

At block 308, the natural language processor may drive the messaging gateway in a feedback loop disengaged from the context controller while the context settings do not meet the completion threshold, as determined in block 306.

At block 310, the natural language processor may apply the context settings to drive the transaction through the context controller to a backend server system once the context settings meet the completion threshold, as determined in block 308. The transactions may be completed using, for example, the backend server system 200 introduced in FIG. 2.

Figure 4:
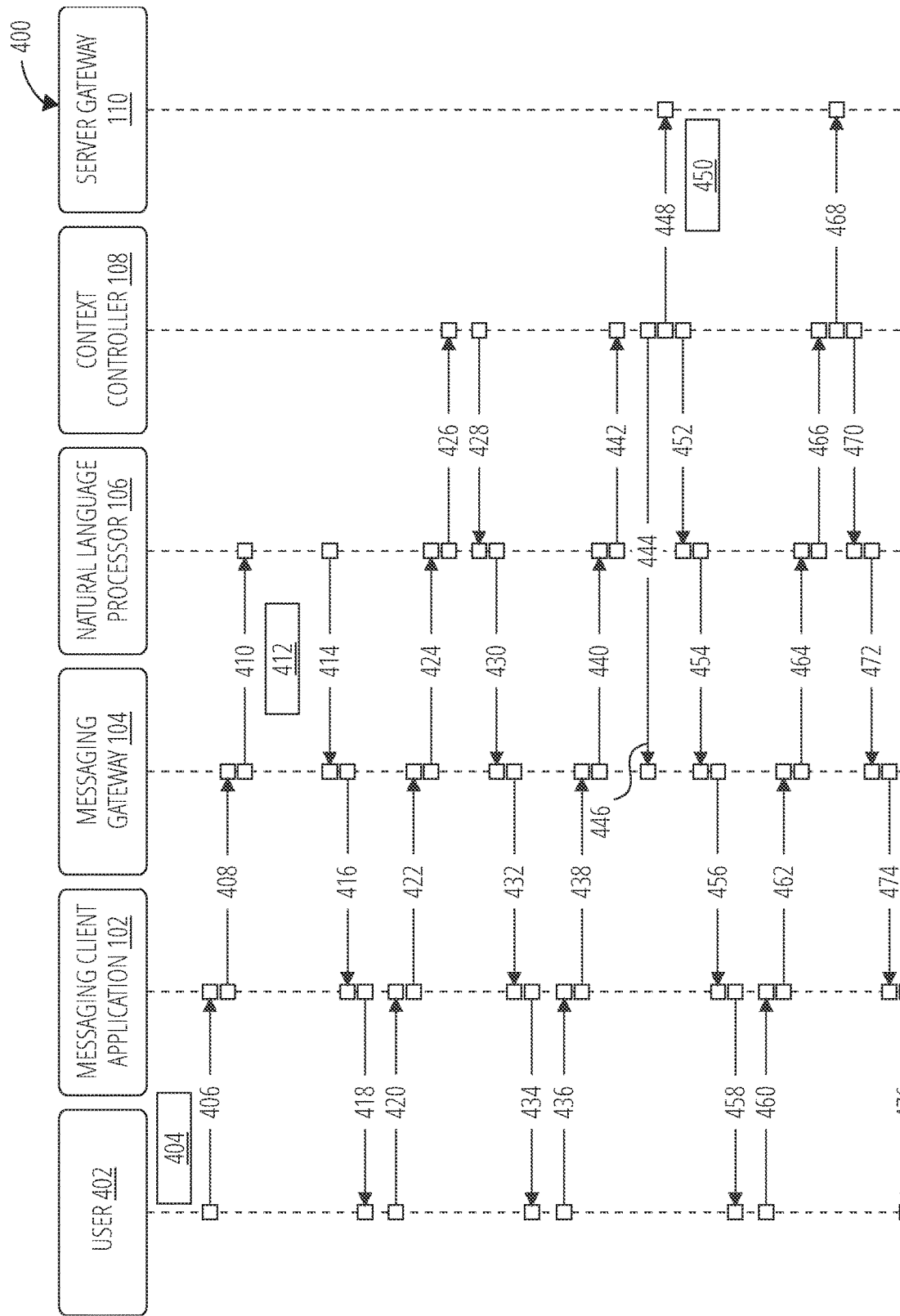
FIG. 4 depicts a resource enhancement transaction 400 in accordance with one embodiment.

FIG. 4 depicts a sequence diagram for a resource enhancement transaction 400 in one embodiment. The sequence diagram depicts a sequence of signals exchanged between a User 402, a messaging client application 102, a messaging gateway 104, a natural language processor 106, a context controller 108, and a server gateway 110. Apart from the User 402, these components may be substantially the same as those introduced in FIG. 1. In the following description the signals/messages are given "friendly names" which evidence and describe their content and purpose. References to a "User" should be understood to refer to a person or to a machine actor.

The process begins assuming the User is registered 404. The User 402 communicates a message to the messaging client application 102, such as 'I would like to enhance resource X' 406. The messaging client application 102 propagates this message through the messaging gateway 104 (SendMessage( ) 408), which in turn propagates the message to the natural language processor 106 (SendMessage( ) 410).

At this point, the natural language processor needs an amount to fulfill intent 412. The natural language processor 106 thus propagates a message back to the User 402 through the messaging gateway 104 (SendMessage( ) 414) and the messaging client application 102 (SendMessage( ) 416). This message may ask the user 'How much of X do you want to add?' 418.

The User 402 may type 'N amount' 420, which is sent back to the natural language processor 106 (SendMessage( ) 422 and SendMessage( ) 424). Having this information, the natural language processor 106 may communicate an Intent:requestResourceCard 426 to the context controller 108. In response, the context controller 108 may send a requestCard 428 signal to the natural language processor 106. From this requestCard 428 signal, the natural language processor 106 may propagate a message back to the User 402 (SendMessage( ) 430 and SendMessage( ) 432), which the User 402 may receive as 'Please send me a picture of your Resource Card' 434.

The User 402 may then Send image of Resource Card 436 through the messaging client application 102 and messaging gateway 104 (SendMessage( ) 438 and SendMessage( ) 440). Having obtained the image, the natural language processor 106 may indicate to the context controller 108 an Intent:AnalyzeCard 442. The context controller 108 may then GetCardPhoto( ) 444 as a non-transformative pass-through 446 from the messaging gateway 104 through the natural language processor 106. The context controller 108 may then send an AnalyzePhoto( ) 448 request to the server gateway 110. Through optical character recognition performed on the other side of the server gateway 110, the card number, expiration date, and cardholder name are obtained 450.

The context controller 108 may then send requestSecurityCode 452 to the natural language processor 106. A message may be propagated back to the User 402 (SendMessage( ) 454 and SendMessage( ) 456), which the User 402 may read as 'Please enter your security code' 458. The User 402 may respond '343' 460, which returns to the natural language processor 106 (SendMessage( ) 462 and SendMessage( ) 464). The natural language processor 106 may then communicate Intent:addResource 466 to the context controller 108. As a result, the context controller 108 may communicate ValidateAndAddResource( ) 468 to the server gateway 110. This command may result in the augmentation of the of the resource pool for User 402 by the amount indicated.

To complete the process, the context controller 108 may instruct the natural language processor 106 to sendConfirmationMessage 470. The natural language processor 106 may propagate a message back to the User 402 (SendMessage( ) 472 and SendMessage( ) 474) reading 'N has been added to your resource pool' 476.

Figure 5:
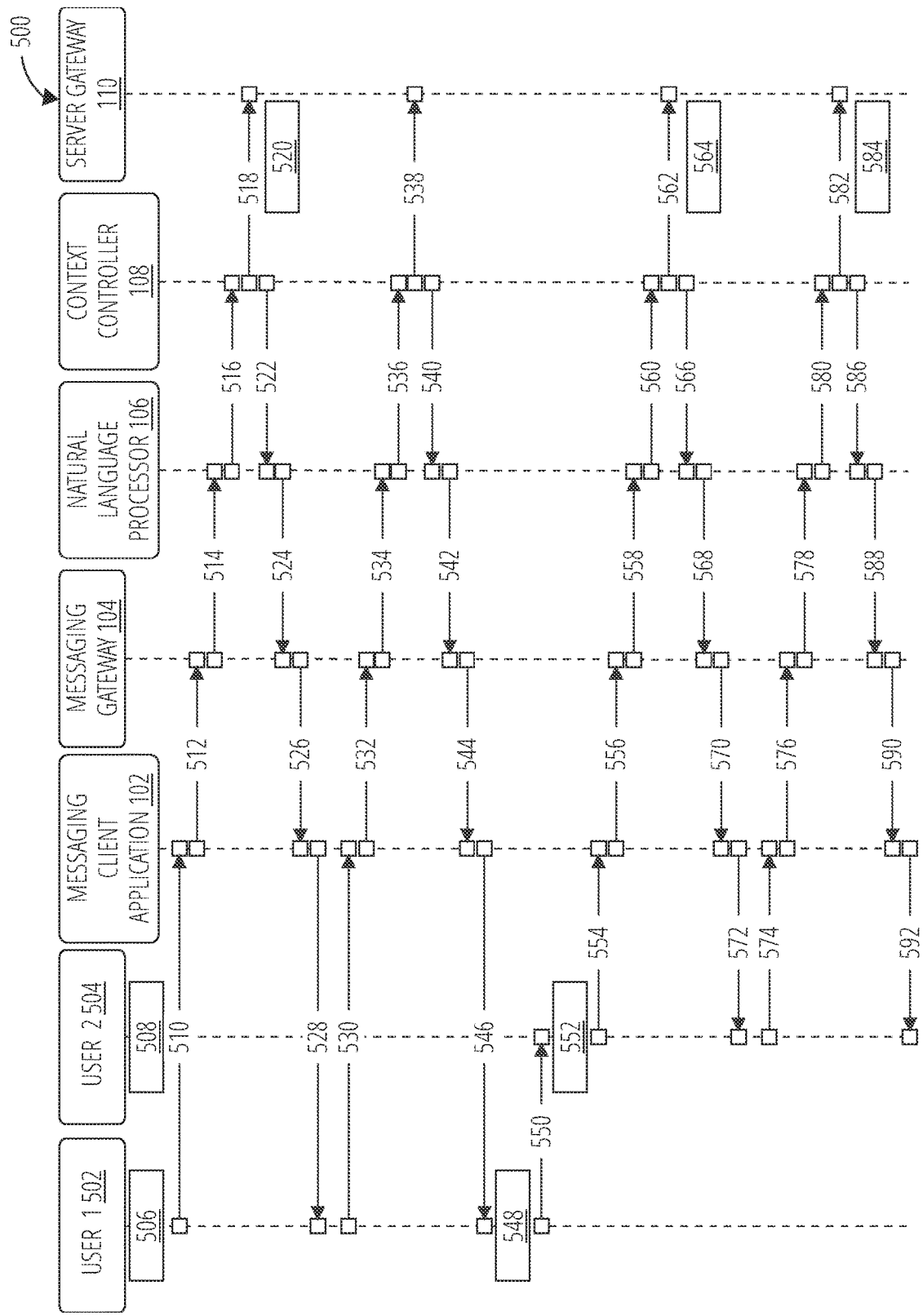
FIG. 5 depicts a resource transfer process 500 in accordance with one embodiment.

FIG. 5 depicts a sequence diagram for a resource transfer process 500 in one embodiment. The sequence diagram depicts a sequence of signals exchanged between a User 1 502, a User 2 504, a messaging client application 102, a messaging gateway 104, a natural language processor 106, a context controller 108, and a server gateway 110. In the following description the signals/messages are given "friendly names" which evidence and describe their content and purpose. References to a "User" should be understood to refer to a person or to a machine actor.

User 1 is registered and has resources 506 and User 2 will be receiving resources 508. User 1 502 may send a message reading 'I want to transfer N resources' 510. This message may be propagated through the messaging client application 102 (SendMessage( ) 512) and the messaging gateway 104 (SendMessage( ) 514) to the natural language processor 106. The natural language processor 106 may indicate an Intent: TransferResource 516 to the context controller 108. The context controller 108 may in turn send CheckIfUserIsResourcePoolAllowTransfer( ) 518 to the server gateway 110.

The server gateway 110 may confirm that User 1 has resources 520. The context controller 108 may in turn send a sendTransferConfirmation 522 message to the natural language processor 106. The natural language processor 106 may propagate this back to the user (SendMessage( ) 524 and SendMessage( ) 526). The user may receive the message 'Are you sure you want to transfer N resources from your available pool of M resources?' 528.

The user may respond 'Yes' 530, which is propagated to the natural language processor 106 (SendMessage( ) 532 and SendMessage( ) 534). The natural language processor 106 may then indicate an Intent:CreateTransfer 536 to the context controller 108. The context controller 108 may instruct the server gateway 110 to CreateTransfer( ) 538, and may return a sendTransferLink 540 instruction to the natural language processor 106. The natural language processor 106 may propagate this to User 1 502 (SendMessage( ) 542 and SendMessage( ) 544. User 1 502 may receive a message such as 'Please share this link to the person you want to transfer resources to: https://link.to.share' 546.

Note that the natural language processor 106 determined that the completion threshold for the context settings was met because to determine the intent it was unnecessary for the natural language processor 106 to know the destination for the resource transfer. Instead, the system generated a generic link that may be provided to any recipient person or machine to move the resources.

In order to complete the transfer, User 1 sends link to User 2 to collect the resources 548. User 2 504 may receive a message reading, 'Hi, this is the link of the transfer I made you!' 550. User 2 clicks the link and a chat opens with a profiled message containing the transfer code 552. User 2 504 may then send a message reading 'Hi! I want to credit this transfer into my resource pool. The code is: XXXXXXXX' 554, which will be propagated to the natural language processor 106 (SendMessage( ) 556 and SendMessage( ) 558). The natural language processor 106 may then generate an Intent:checkTransferCode 560 to send to the context controller 108. The context controller 108 in turn may instruct the server gateway 110 with CheckIfTransferIsValid(code) 562.

In the case that the server gateway 110 confirms that User 2 is able to credit this transfer 564, the context controller 108 may send a confirmCredit 566 instruction to the natural language processor 106. This may be propagated as a message to User 2 504 (SendMessage( ) 568 and SendMessage( ) 570). User 2 504 may receive a message such as, 'Do you want to credit N resources into your resource pool?' 572.

User 2 504 may respond, 'Yes' 574, which is returned to the natural language processor 106 (SendMessage( ) 576 and SendMessage( ) 578). This may result in the natural language processor 106 sending an Intent:creditTransfer 580 to the context controller 108. The context controller 108 may generate a creditTransfer(code) 582 message, sent to the server gateway 110. N resources added to User 2 resource pool 584 may result.

To complete the process, the context controller 108 may notify the natural language processor 106 with transferDone 586. The natural language processor 106 may return a message to User 2 504 (SendMessage( ) 588 and SendMessage( ) 590) reading 'Resources have been added to your resource pool. Your new resource level is L' 592.

Figure 6:
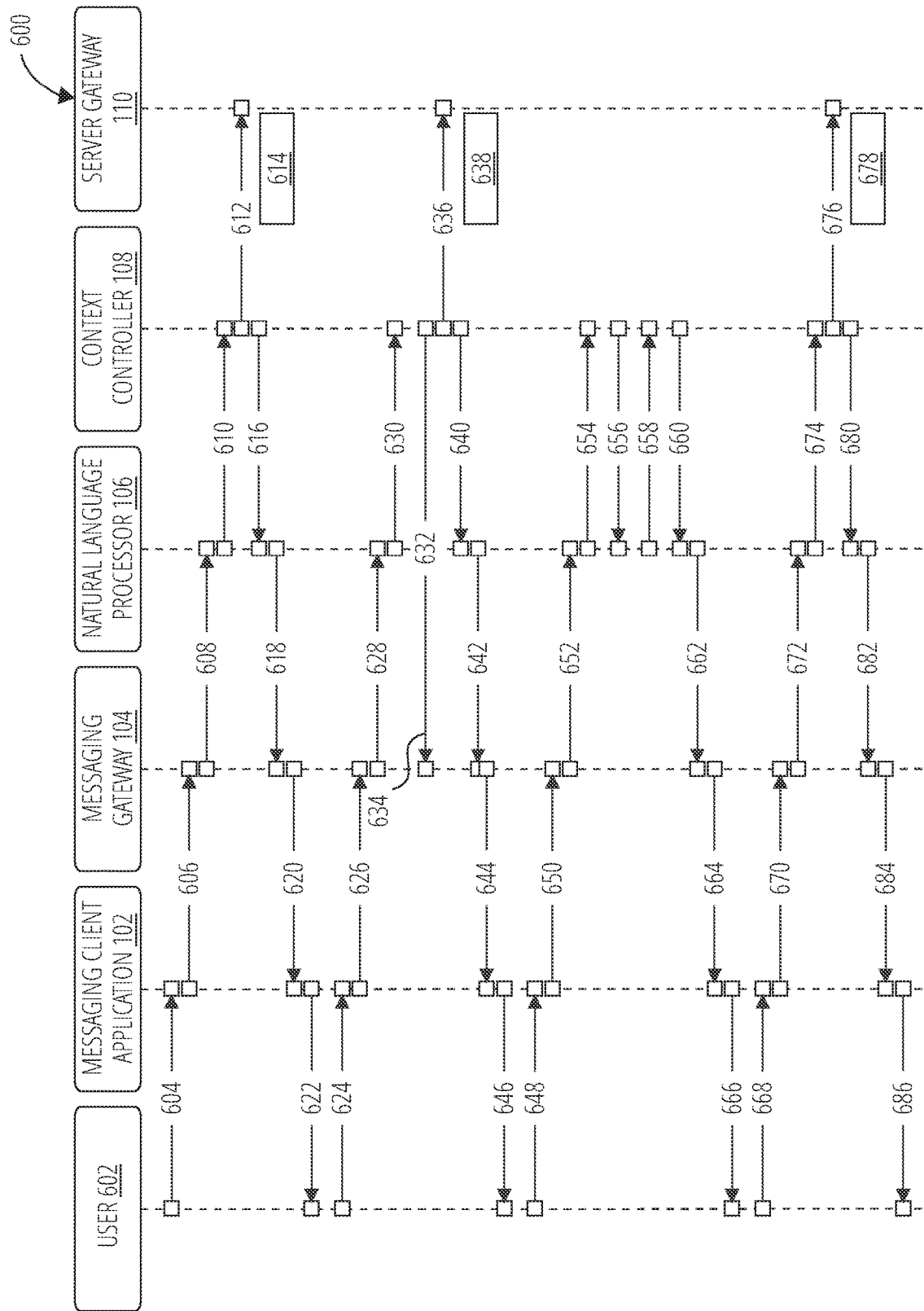
FIG. 6 depicts a user registration process 600 in accordance with one embodiment.

FIG. 6 depicts a user registration process 600 in accordance with one embodiment. The sequence diagram depicts a sequence of signals exchanged between a User 602, a messaging client application 102, a messaging gateway 104, a natural language processor 106, a context controller 108, and a server gateway 110. In the following description the signals/messages are given "friendly names" which evidence and describe their content and purpose. References to a "User" should be understood to refer to a person, although one of ordinary skill in the art will readily ascertain how the registration process may be adapted to register a machine actor.

The user registration process 600 may begin when a User 602 sends a message such as, 'Hello' 604 to a transaction system. The message may be propagated from the User 602 through the messaging client application 102 (SendMessage( ) 606) and the messaging gateway 104 (SendMessage( ) 608) to reach the natural language processor 106. The natural language processor 106 may indicate an Intent: DefaultWelcome 610 to the context controller 108. The context controller 108 may send a CheckIfUserIs Registered( ) 612 command to the server gateway 110, where it may be determined that User is not registered 614.

As a result, the context controller 108 may send an offerRegistration 616 instruction to the natural language processor 106. The natural language processor 106 may propagate this message to the User 602 (SendMessage( ) 618 and SendMessage( ) 620). The User 602 may receive a message reading, 'You are not registered yet. Do you want to sign up?' 622.

The User 602 may respond with, 'Yes' 624, which may be propagated back to the natural language processor 106 (SendMessage( ) 626 and SendMessage( ) 628). The natural language processor 106 may send a request to the User 602 (not pictured) for an image of the user's identification, similar to the request for a credit card image shown in FIG. 4. The natural language processor 106 may then determine an Intent:RegisterPhoto 630, which it may send to the context controller 108. The context controller 108 may send a GetIDPhoto( ) 632 command, and retrieve a non-transformative pass-through 634 of the requested image through the natural language processor 106. The context controller 108 may then send an AnalyzePhoto( ) 636 command to the server gateway 110. The Name, ID number, nationality, sex, and date of birth are obtained 638 through optical character recognition on the other side of the server gateway 110.

The context controller 108 may then send requestEmail 640 to the natural language processor 106. A message may be propagated form the natural language processor 106 to the User 602 (SendMessage( ) 642 and SendMessage( ) 644), reading, 'Can you give me your email' 646. The User 602 may reply with their email address, such as, 'user@email.com' 648, which returns to the natural language processor 106 (SendMessage( ) 650 and SendMessage( ) 652). The natural language processor 106 may determine an Intent:RegisterEmail 654, which it may communicate to the context controller 108.

The context controller 108 may inform the natural language processor 106 of an emailConfirmed 656. The natural language processor 106 may indicate an Intent:ValidateData 658 to the context controller 108 in return. In response, the context controller 108 may instruct the natural language processor 106 to sendDataConfirmationMessage 660. The natural language processor 106 may propagate a confirmation message to the User 602 (SendMessage( ) 662 and SendMessage( ) 664) such as, 'Is this information correct?' Shows name, ID, email, etc. 666.

The User 602 may reply, 'Yes' 668, which is propagated to the natural language processor 106 (SendMessage( ) 670 and SendMessage( ) 672). The natural language processor 106 may infer an Intent:CreateUser 674, which it may communicate to the context controller 108. The context controller 108 may then send a CreateUser( ) 676 command to the server gateway 110. The User is registered 678 in the server as a result. The context controller 108 may instruct the natural language processor 106 to send a welcomeMessage 680. The natural language processor 106 may propagate this back to the User 602 through the messaging gateway 104 and messaging client application 102 (SendMessage( ) 682 and SendMessage( ) 684, respectively). The User 602 may receive a message reading, 'You are now registered. What can I help you with?' 686. The user registration process 600 is now complete.

Figure 7:
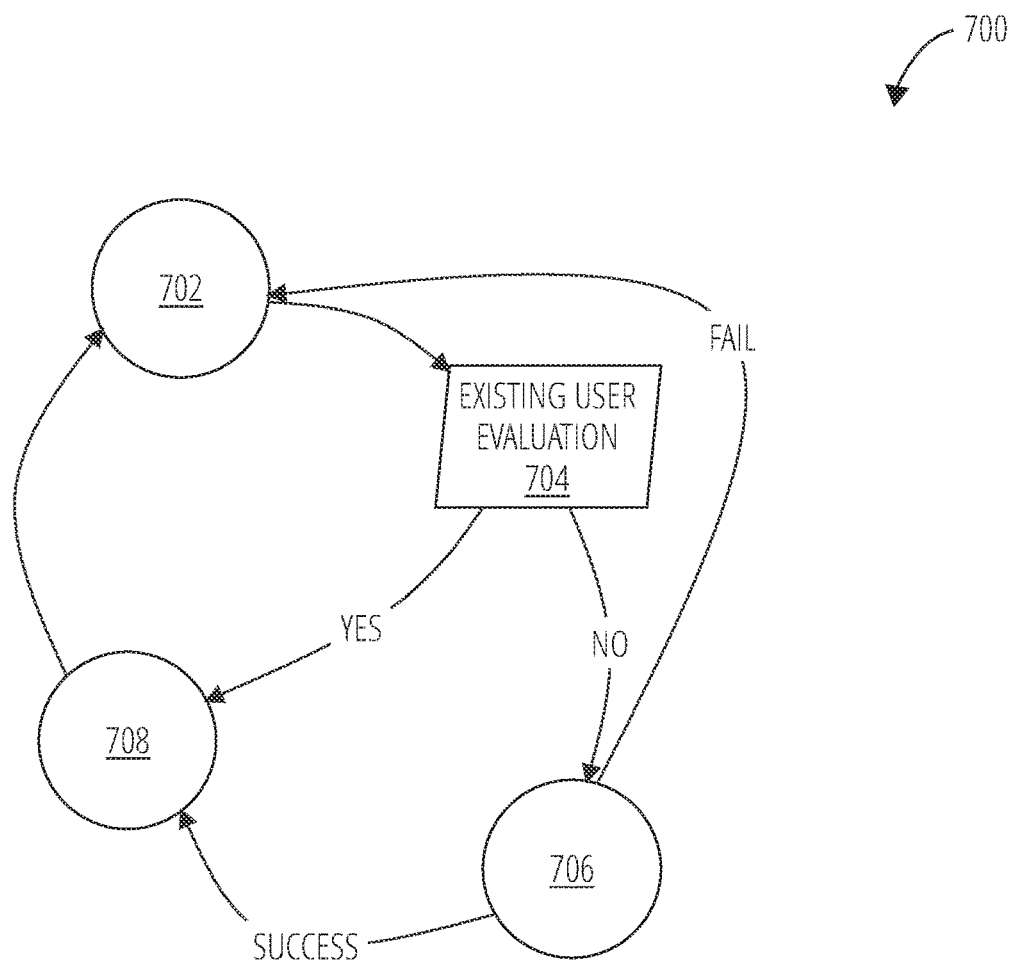
FIG. 7 depicts a state machine 700 in accordance with one embodiment.

FIG. 7 depicts a state machine 700 for responding to a user request for information on a resource level, in one embodiment. The state machine 700 may be implemented by or cooperative with the context controller 108.

The state machine 700 comprises a home state 702, an existing user evaluation 704, a new user registration state 706, and a get resource level state 708. From the home state 702 the existing user evaluation 704 is made. If the user is an existing user, the state machine 700 transitions to the get resource level state 708, which reports the resource level to the user. If the user is not an existing user, the state machine 700 transitions to the new user registration state 706, and if the new user is successfully registered, to the get resource level state 708. Failure to register the user transitions the state machine 700 back to the home state 702.

Figure 8:
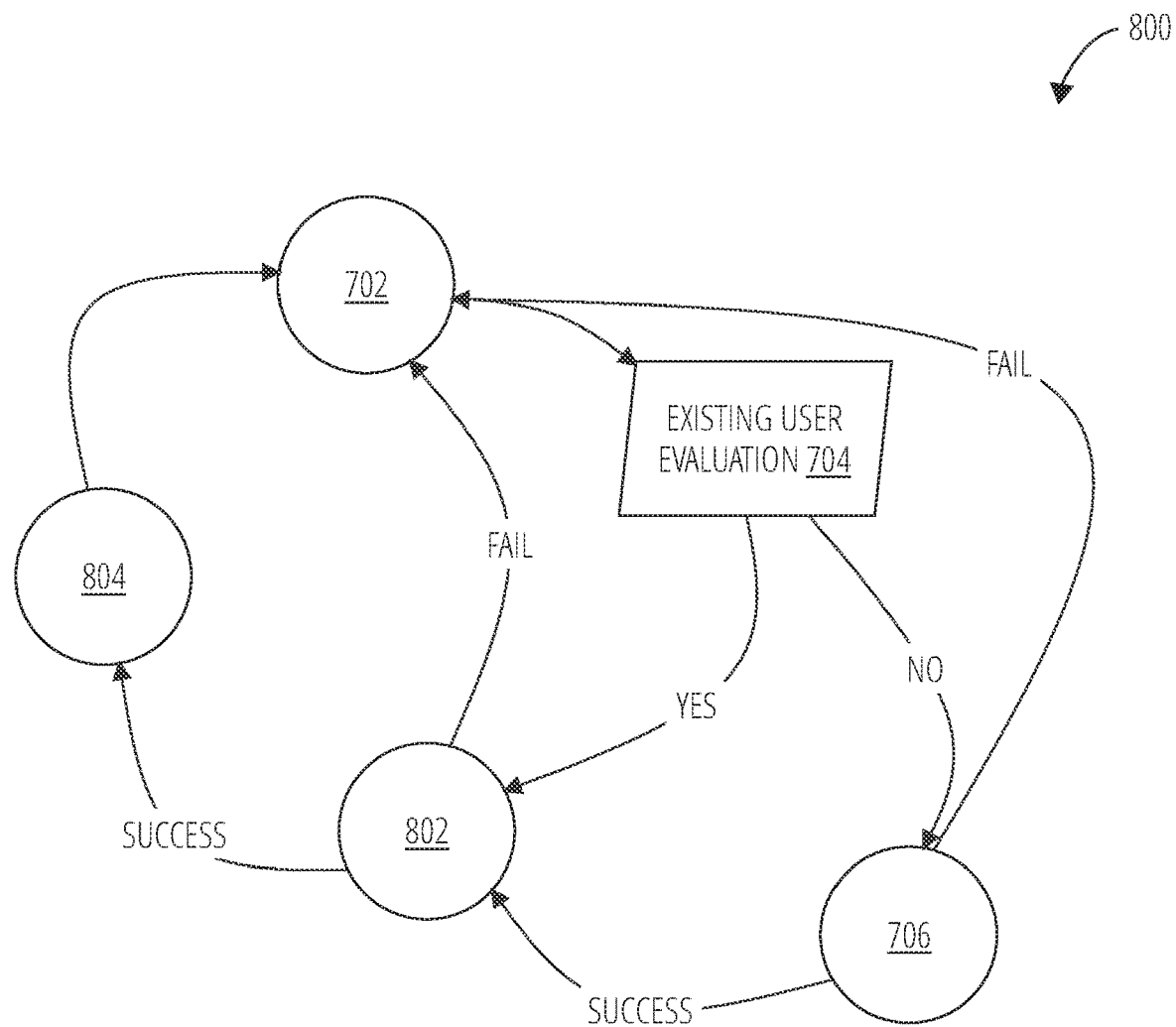
FIG. 8 depicts a state machine 800 in accordance with one embodiment.

FIG. 8 depicts an embodiment of a state machine 800 for registering a new transaction instrument, which a user can use to effect resource-related transactions in the transaction system 100. The transaction instrument comprises a set of information that may be used to authenticate a user and identify a source and/or destination resource for transactions.

If the existing user evaluation 704 succeeds, or a new user is added at new user registration state 706, the state machine 800 transitions to the transaction instrument transformation state 802, which may, if necessary, operate the transformation algorithms 206 on a depiction of a transaction instrument provided by the user with the transaction request. If the transaction instrument transformation state 802 fails, the state machine 800 transitions back to the home state 702. If the transaction instrument transformation state 802 succeeds, the state machine 800 transitions to the new transaction instrument state 804 to add the transaction instrument to the database system 208 in association with the user, for use in future resource-related transactions in the transaction system 100.

Figure 9:
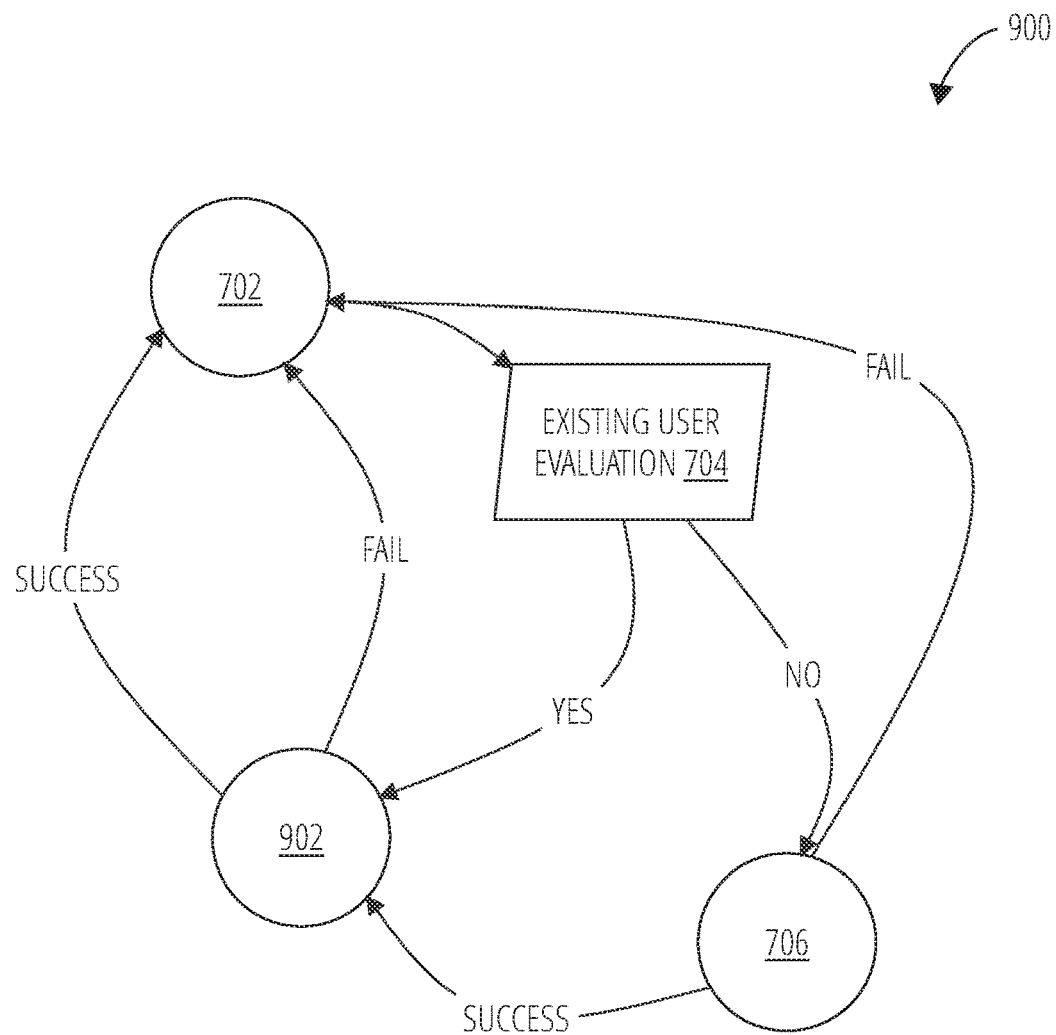
FIG. 9 depicts a state machine 900 in accordance with one embodiment.

FIG. 9 depicts an embodiment of a state machine 900 for enhancing a resource pool in the transaction system 100. If the existing user evaluation 704 succeeds, or a new user is added at new user registration state 706, the state machine 900 transitions to the resource enhancement state 902, which adds a specified amount of resources to a resource pool identified in the transaction (e.g., using a transaction instrument).

Figure 10:
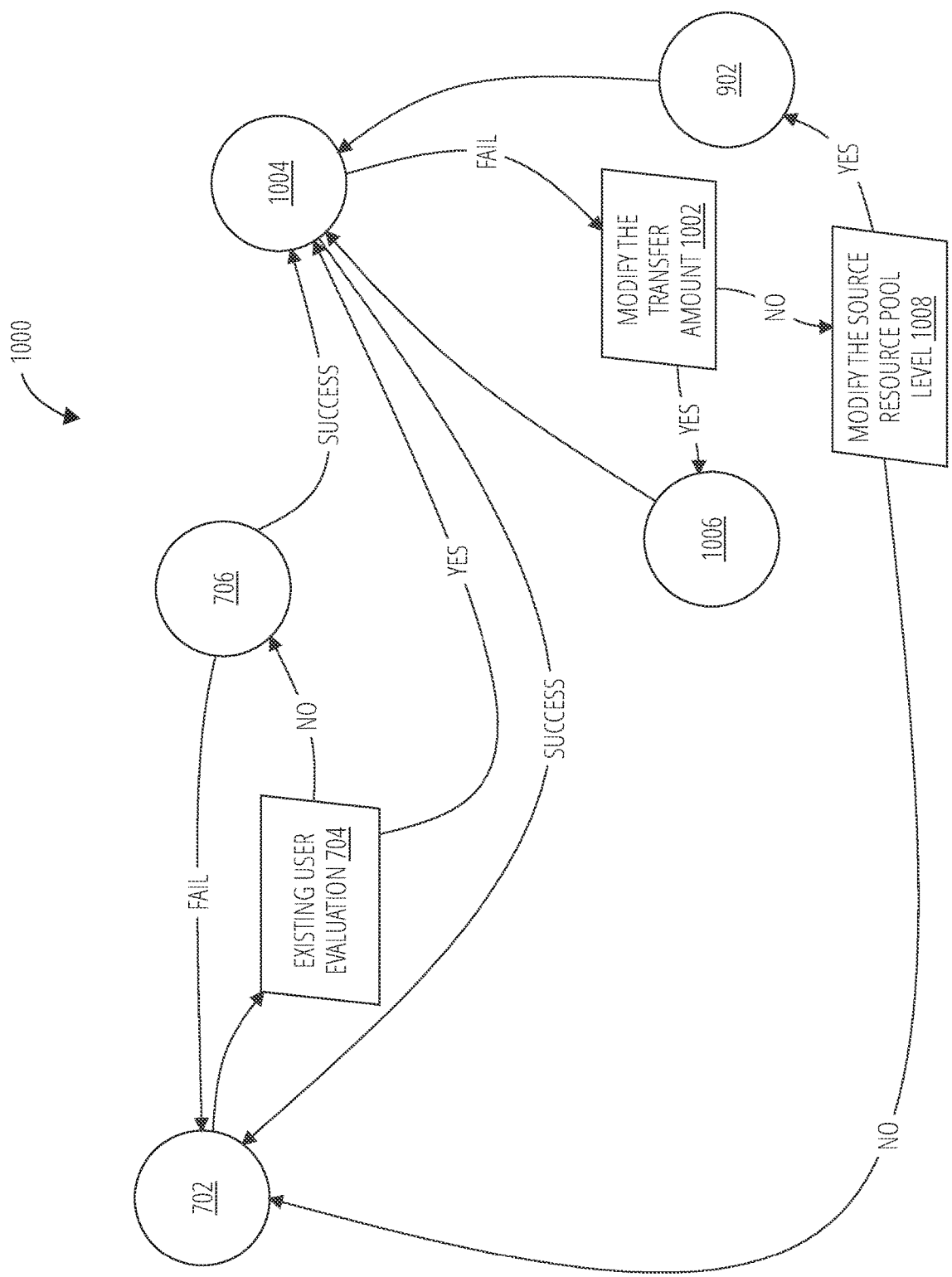
FIG. 10 depicts a state machine 1000 in accordance with one embodiment.

FIG. 10 depicts an embodiment of a state machine 1000 to effect a transfer of resources between two resource pools in the transaction system 100. Upon success of the existing user evaluation 704 (or addition of a new user at new user registration state 706), the state machine 1000 transitions to the transfer resources state 1004. The transfer resources state 1004 may fail for a number of reasons. If the amount to transfer from a first resource pool exceeds the available resources in the first resource pool, the state machine 1000 transitions to modify the transfer amount 1002. If the user wants to modify the transfer amount 1002, the state machine 1000 transitions to the transfer level modify state 1006 and then back to transfer resources state 1004 to reattempt the resource re-allocation. If the user does not want to modify the transfer amount (the amount of resource to draw from the source resource pool), the state machine 1000 transfers to modify the source resource pool level 1008. If the user wants to modify the source resource pool level 1008, the state machine 1000 transitions to the resource enhancement state 902 to add resources to the source resource pool, then back to the transfer resources state 1004 to retry the resource re-allocation. Otherwise, the resource re-allocation cannot be performed and the state machine 1000 transitions back to the home state 702.

Figure 11:
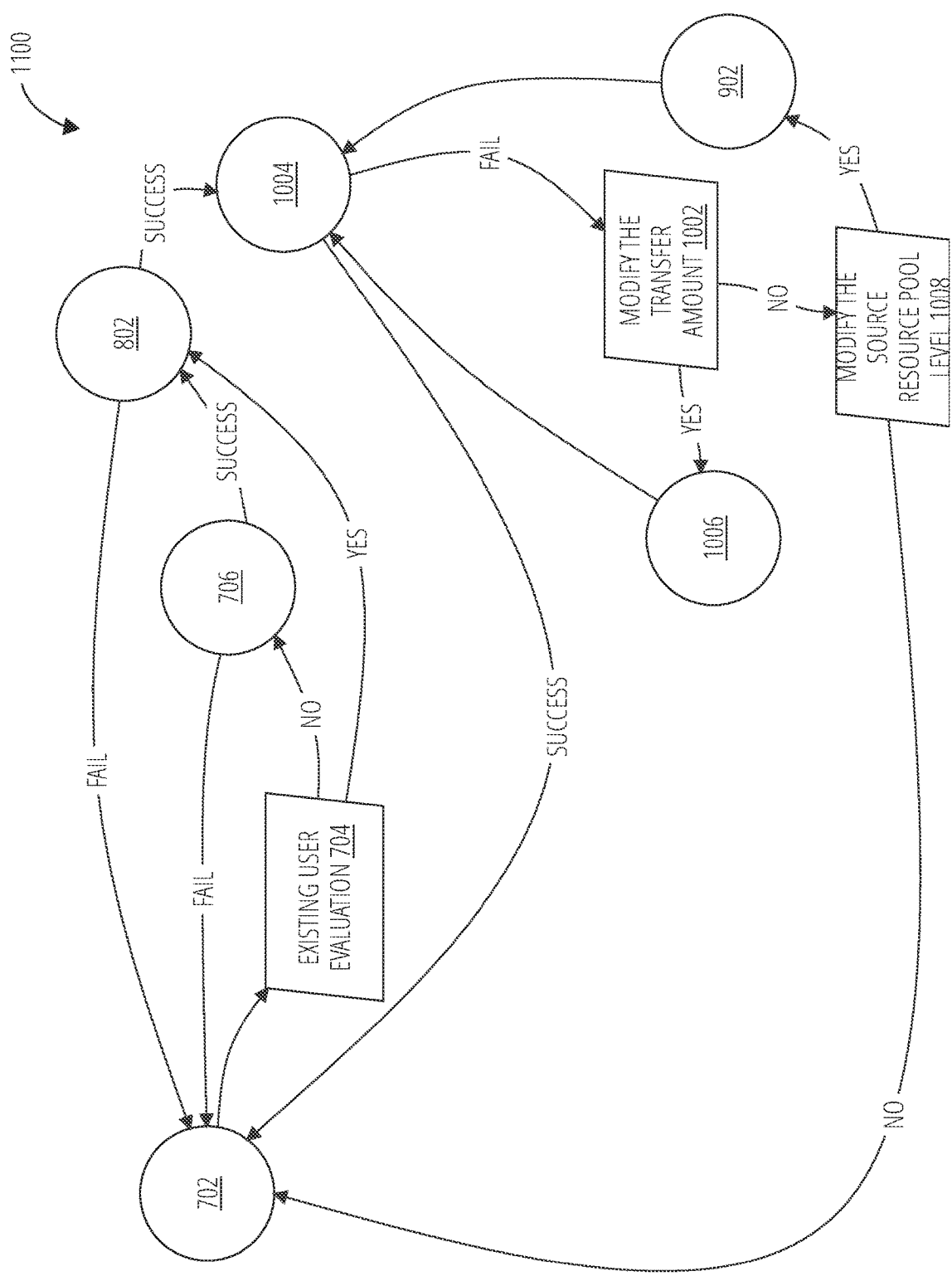
FIG. 11 depicts a state machine 1100 in accordance with one embodiment.

FIG. 11 depicts an embodiment of a state machine 1100 that combines the use of a transaction instrument with a resource re-allocation. The state machine 1100 may be utilized with a transaction instrument, such as a QR code, which may be provided identifying aspects of the transaction, such as source resource pool, destination resource pool, and other information.

Software Implementations

The systems disclosed herein, or particular components thereof, may in some embodiments be implemented as software comprising instructions executed on one or more programmable devices. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network. "Subroutine" refers to a module configured to perform one or more calculations or other processes. In some contexts the term "subroutine" refers to a module that does not return a value to the logic that invokes it, whereas a "function" returns a value. However, herein the term "subroutine" is used synonymously with "function". "Task" refers to one or more operations that a process performs. However, the system need not necessarily be accessed over a network and could, in some embodiments, be implemented by one or more app or applications on a single device or distributed between a mobile device and a computer, for example.

"Instructions" refers to symbols representing commands for execution by a device using a processor, microprocessor, controller, interpreter, or other programmable logic. Broadly, "instructions" can mean source code, object code, and executable code. "Instructions" herein is also meant to include commands embodied in programmable read-only memories (EPROM) or hard coded into hardware (e.g., "micro-code") and like implementations wherein the instructions are configured into a machine memory or other hardware component at manufacturing time of a device.

"Interpreter" refers to logic that directly executes instructions written in a source code scripting language, without requiring the instructions to a priori be compiled into machine language. An interpreter translates the instructions into another form, for example into machine language, or into calls to internal functions and/or calls to functions in other software modules.

"Logic" refers to any set of one or more components configured to implement functionality in a machine. Logic includes machine memories configured with instructions that, when executed by a machine processor, cause the machine to carry out specified functionality; discrete or integrated circuits configured to carry out the specified functionality; and machine/device/computer storage media configured with instructions that, when executed by a machine processor, cause the machine to carry out specified functionality. Logic specifically excludes software per se, signal media, and transmission media.

"Source code" refers to a high-level, textual computer language that requires either interpretation or compilation in order to be executed by a device. "Object code" refers to the computer code output by a compiler or as an intermediate output of an interpreter. Object code often takes the form of machine language or an intermediate language, such as register transfer language (RTL). "Executable code" refers to instructions in a form ready to be executed by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"Machine language" refers to instructions in a form that is directly executable by a programmable device without further translation by a compiler, interpreter, or assembler. In digital devices, machine language instructions are typically sequences of ones and zeros.

"Software" refers to logic implemented as instructions for controlling a programmable device or component of a device (e.g., a programmable processor or controller). Software can be source code, object code, executable code, machine language code, etc. Unless otherwise indicated by context, software shall be understood to mean the embodiment of said code in a machine memory or hardware component, including "firmware" and micro-code.

"Module" refers to a computer code section having defined entry and exit points. Examples of modules are any software comprising an application program interface, drivers, libraries, functions, and subroutines.

"Computer code" refers to any of source code, object code, or executable code. "Compiler" refers to logic that transforms source code from a high-level programming language into object code or, in some cases, into executable code.

"Programmable device" refers to any logic (including hardware and software logic) with operational behavior that is configurable with instructions. "Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application, and the application relies on modules of the operating system in most cases, not vice-versa. The operating system also typically intermediates between applications and drivers. Drivers are said to execute "below" the operating system because they intermediate between the operating system and hardware components or peripheral devices.

"Interpreted computer code" refers to instructions in a form suitable for execution by an interpreter. "Executable" refers to a file comprising executable code. If the executable code is not interpreted computer code, a loader is typically used to load the executable for execution by a programmable device.

"Computer code section" refers to one or more instructions. "Application program interface" refers to instructions implementing entry points and return values to a module. "Driver" refers to low-level logic, typically software, that controls components of a device. Drivers often control the interface between an operating system or application and input/output components or peripherals of a device, for example.

"File" refers to a unitary package for storing, retrieving, and communicating data and/or instructions. A file is distinguished from other types of packaging by having associated management metadata utilized by the operating system to identify, characterize, and access the file.

"Loader" refers to logic for loading programs and libraries. The loader is typically implemented by the operating system. A typical loader copies an executable into memory and prepares it for execution by performing certain transformations, such as on memory addresses.

Figure 12:
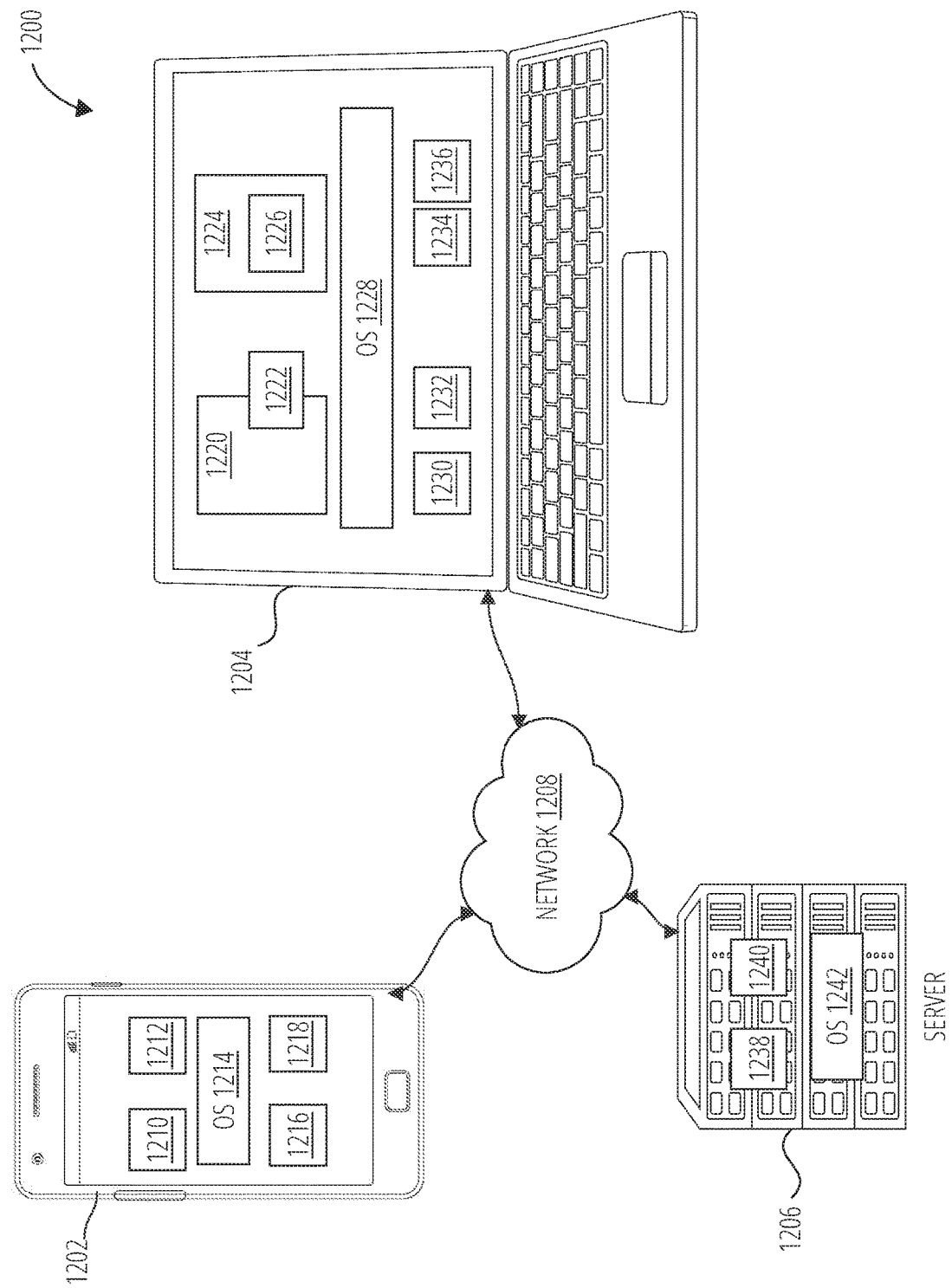
FIG. 12 depicts a client server network configuration 1200 in accordance with one embodiment.

Referring to FIG. 12, a client server network configuration 1200 illustrates various computer hardware devices and software modules coupled by a network 1208 in one embodiment. Each device includes a native operating system, typically pre-installed on its non-volatile RAM, and a variety of software applications or apps for performing various functions.

The mobile programmable device 1202 comprises a native operating system 1214 and various apps (e.g., app 1210 and app 1212). A computer 1204 also includes an operating system 1228 that may include one or more libraries of native routines to run executable software on that device. "Library" refers to a collection of modules organized such that the functionality of all the modules may be included for use by software using references to the library in source code. The computer 1204 also includes various executable applications (e.g., application 1220 and application 1224). The mobile programmable device 1202 and computer 1204 are configured as clients on the network 1208. A server 1206 is also provided and includes an operating system 1242 with native routines specific to providing a service (e.g., service 1240 and service 1238) available to the networked clients in this configuration.

As is well known in the art, an application, an app, or a service may be created by first writing computer code to form a computer program, which typically comprises one or more computer code sections or modules. "Computer program" refers to another term for "application" or "app". Computer code may comprise instructions in many forms, including source code, assembly code, object code, executable code, and machine language. "Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported. Computer programs often implement mathematical functions or algorithms and may implement or utilize one or more application program interfaces. "Algorithm" refers to any set of instructions configured to cause a machine to carry out a particular function or process.

A compiler is typically used to transform source code into object code, and thereafter a linker combines object code files into an executable application, recognized by those skilled in the art as an "executable". "Linker" refers to logic that inputs one or more object code files generated by a compiler or an assembler and combines them into a single executable, library, or other unified object code output. One implementation of a linker directs its output directly to machine memory as executable code (performing the function of a loader as well). The distinct file comprising the executable would then be available for use by the computer 1204, mobile programmable device 1202, and/or server 1206. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1226).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1216 or driver 1218 on the mobile programmable device 1202 or computer 1204 (e.g., driver 1230 and driver 1232) might enable wireless headphones to be used for audio output(s) and a camera to be used for video inputs. Any of the devices may read and write data from and to files (e.g., file 1234 or file 1236) and applications or apps may utilize one or more plug-ins (e.g., plug-in 1222) to extend their capabilities (e.g., to encode or decode video files). "Plug-in" refers to software that adds features to an existing computer program without rebuilding (e.g., changing or re-compiling) the computer program. Plug-ins are commonly used for example with Internet browser applications.

The network 1208 in the client server network configuration 1200 can be of a type understood by those skilled in the art, including a Local Area Network (LAN), Wide Area Network (WAN), Transmission Communication Protocol/Internet Protocol (TCP/IP) network, and so forth. These protocols used by the network 1208 dictate the mechanisms by which data is exchanged between devices.

Machine Embodiments

Figure 13:
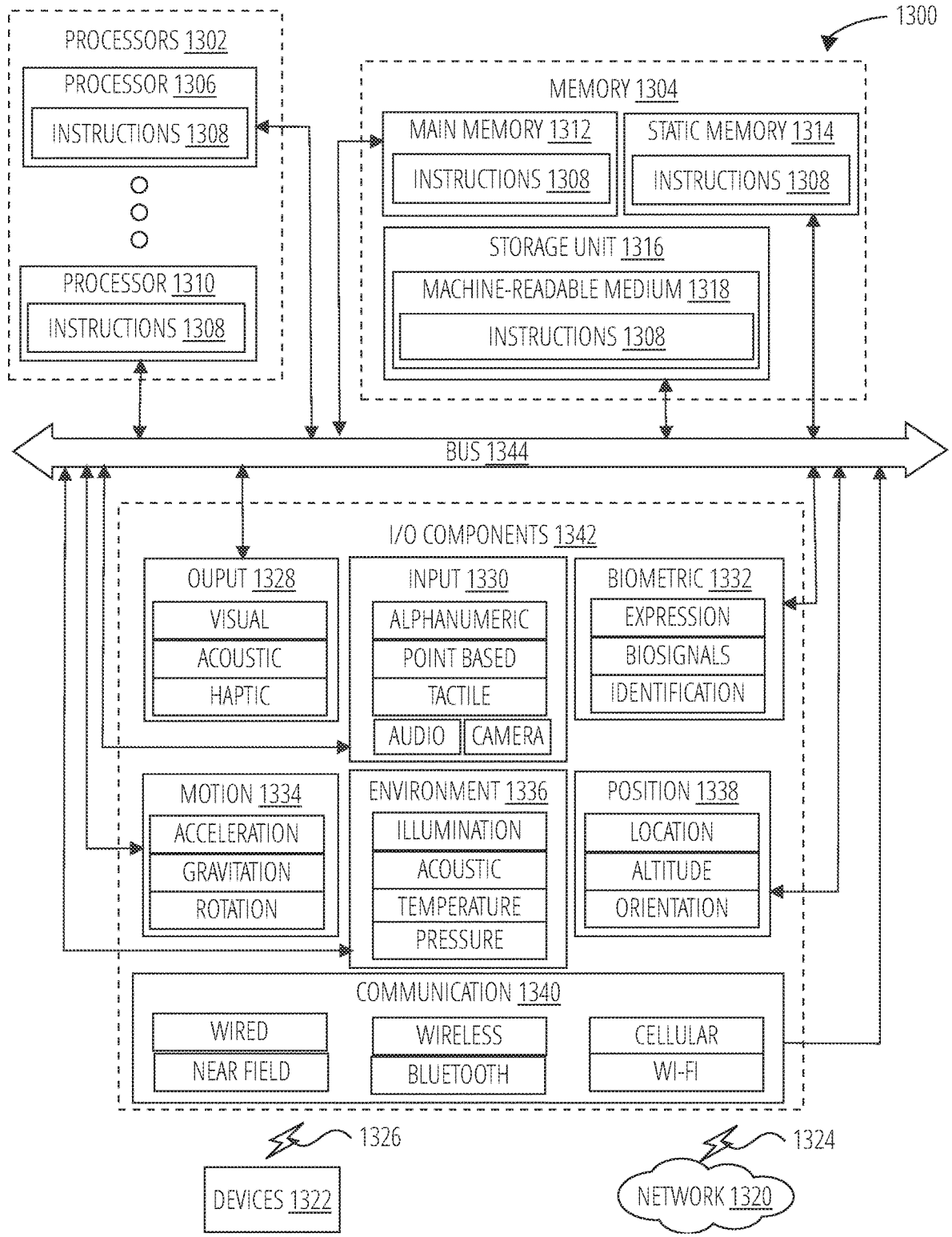
FIG. 13 depicts a machine 1300 in the form of a computer system within which a set of instructions may be executed for causing the machine 1300 to perform any one or more of the methodologies discussed herein, according to an example embodiment.

FIG. 13 depicts a diagrammatic representation of a machine 1300 in the form of a computer system within which logic may be implemented to cause the machine to perform any one or more of the functions or methods disclosed herein, according to an example embodiment.

Specifically, FIG. 13 depicts a machine 1300 comprising instructions 1308 (e.g., a program, an application, an applet, an app, or other executable code) for causing the machine 1300 to perform any one or more of the functions or methods discussed herein. For example, the instructions 1308 may cause the machine 1300 to implement a natural language processor, context controller, state machine, image transformation logic, on-demand service, etc. Generally, the instructions 1308 configure a general, non-programmed machine into a particular machine 1300 programmed to carry out said functions and/or methods.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is depicted, the term "machine" shall also be taken to include a collection of machines, such as the backend server system 200, that individually or jointly execute the instructions 1308 to perform any one or more of the methodologies or subsets thereof discussed herein.

The machine 1300 may include processors 1302, memory 1304, and I/O components 1342, which may be configured to communicate with each other, such as via one or more buses 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, one or more processors (e.g., processor 1306 and processor 1310) to execute the instructions 1308. The term "processor" is intended to include multi-core processors that may comprise two or more independent processors (sometimes referred to as "cores") that may execute instructions contemporaneously. Although FIG. 13 depicts multiple processors 1302, the machine 1300 may include a single processor with a single core, a single processor with multiple cores (e.g., a multi-core processor), multiple processors with a single core, multiple processors with multiples cores, or any combination thereof.

The memory 1304 may include one or more of a main memory 1312, a static memory 1314, and a storage unit 1316, each accessible to the processors 1302 such as via the bus 1344. The main memory 1312, the static memory 1314, and storage unit 1316 may be utilized, individually or in combination, to store the instructions 1308 embodying any one or more of the functionalities described herein. The instructions 1308 may reside, completely or partially, within the main memory 1312, within the static memory 1314, within a machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones will likely include a touch input device or other such input mechanisms, while a headless server machine will likely not include such a touch input device. It will be appreciated that the I/O components 1342 may include many other components that are not shown in FIG. 13. The I/O components 1342 are grouped according to functionality merely for simplifying the following discussion and the grouping is in no way limiting. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor or resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1342 may include biometric components 1332, motion components 1334, environmental components 1336, or position components 1338, among a wide array of possibilities. For example, the biometric components 1332 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., an accelerometer), gravitation sensor components, rotation sensor components (e.g., a gyroscope), and so forth. The environmental components 1336 may include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 may include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 1304, main memory 1312, static memory 1314, and/or memory of the processors 1302) and/or storage unit 1316 may store one or more sets of instructions and data structures (e.g., software) embodying or utilized by any one or more of the methodologies or functions described herein. These instructions (e.g., the instructions 1308), when executed by processors 1302, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories and optical and magnetic media, including memory internal or external to processors and internal or external to computer systems. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 1320 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1320 or a portion of the network 1320 may include a wireless or cellular network, and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1xRTT), Evolution-Data Optimized (EVDO) technology, General Packet Radio service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1308 and/or data generated by or received and processed by the instructions 1308 may be transmitted or received over the network 1320 using a transmission medium via a network interface device (e.g., a network interface component included in the communication components 1340) and utilizing any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1308 for execution by the machine 1300, and/or data generated by execution of the instructions 1308, and/or data to be operated on during execution of the instructions 1308, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
   a messaging gateway;
   a natural language processor;
   a context controller;
   logic to configure the natural language processor to drive the messaging gateway in a feedback loop without engaging the context controller while a context state of a transaction initiated with a backend server system through the messaging gateway remains incomplete;
   logic to engage the context controller with the context state and to intermediate the transaction between the backend server system and the messaging gateway once the context state meets a completion threshold;
   the natural language processor configured to receive images via the messaging gateway;
   the natural language processor configured to execute a non-transformative pass-through of the images to the context controller;
   image transformation logic to receive and transform the images to text; and
   a server gateway disposed between the image transformation logic and the context controller.

2. The system of claim 1, wherein the context state is a transaction intent.

3. The system of claim 2, wherein the natural language processor comprises a neural network and the transaction intent is a classification value.

4. The system of claim 1, wherein the natural language processor aggregates and transforms a plurality of distinct natural language messages from the messaging gateway into the context state.

5. The system of claim 4, the natural language processor configured to drive the feedback loop through the messaging gateway with response messages until the context state meets the completion threshold.

6. The system of claim 1, further comprising:
   the context controller configured to initiate via the server gateway one or more on-demand services to interact with the image transformation logic.

7. The system of claim 1, further comprising:
   the image transformation logic configured to enhance the context state; and
   the context controller configured to receive an enhanced context state from the image transformation logic and to drive the messaging gateway based on the enhanced context state.

8. The system of claim 1, wherein the natural language processor is configured with a first state machine and the context controller is configured with a second state machine.

9. The system of claim 8, wherein the first state machine operates the natural language processor independently of operation of the context controller by the second state machine.

10. A method comprising:
    receiving a natural language transaction via a messaging gateway;
    operating a natural language processor to transform the natural language transaction into context settings, wherein the natural language processor executes a non-transformative pass-through of images to a context controller;
    operating the natural language processor to apply configuration settings from a state machine implemented by the context controller to determine a completion threshold of the context settings;

operating the natural language processor to drive the messaging gateway in a feedback loop disengaged from the context controller while the context settings do not meet the completion threshold; and applying the context settings to drive the transaction through the context controller to a backend server system once the context settings meet the completion threshold, wherein the context controller drives the backend server system to transform the images to text or identifications of objects depicted in the images.

11. The method of claim 10, wherein the context settings define a transaction intent.

12. The method of claim 11, wherein the natural language processor comprises a neural network and the transaction intent is a classification value.

13. The method of claim 10, wherein the natural language processor aggregates and transforms a plurality of distinct natural language messages from the messaging gateway into the context settings.

14. The method of claim 13, wherein the natural language processor drives the feedback loop through the messaging gateway with response messages until the context settings meet the completion threshold.

15. The method of claim 10, further comprising:
the context controller initiating one or more on-demand services of the backend server system to transform the images.

16. The method of claim 10, further comprising:
applying transformed images to enhance the context state; and
the context controller receiving an enhanced context state from the backend server system and driving a messaging gateway based on the enhanced context state.

17. The method of claim 10, configuring the natural language processor with a first state machine and configuring the context controller with a second state machine.

18. The method of claim 17, further comprising operating the first state machine on the natural language processor independently of operating the second state machine on the context controller.

* * * * *